United States Patent
Maltsev et al.

(10) Patent No.: US 9,118,372 B2
(45) Date of Patent: Aug. 25, 2015

(54) METHOD AND APPARATUS FOR DOWNLINK MULTIUSER MIMO TRANSMISSION IN A WIRELESS NETWORK

(75) Inventors: Alexander Maltsev, Nizhny Novgorod (RU); Alexey Khoryaev, Dzerhinsk (RU); Roman Maslennikov, Nizhny Novgorod (RU); Andrey Chervyakov, Nizhny Novgorod (RU)

(73) Assignee: INTEL CORPORATION, Santa Clara, CA (US)

( * ) Notice: Subject to any disclaimer, the term of this patent is extended or adjusted under 35 U.S.C. 154(b) by 551 days.

(21) Appl. No.: 13/519,102

(22) PCT Filed: Dec. 25, 2009

(86) PCT No.: PCT/RU2009/000728
§ 371 (c)(1),
(2), (4) Date: Oct. 9, 2012

(87) PCT Pub. No.: WO2011/078726
PCT Pub. Date: Jun. 30, 2011

(65) Prior Publication Data
US 2013/0044683 A1 Feb. 21, 2013

(51) Int. Cl.
*H04B 7/06* (2006.01)
*H04B 7/04* (2006.01)

(52) U.S. Cl.
CPC ............ *H04B 7/0617* (2013.01); *H04B 7/0404* (2013.01); *H04B 7/0452* (2013.01); *H04B 7/0684* (2013.01); *H04B 7/0697* (2013.01); *H04B 7/043* (2013.01); *H04B 7/0626* (2013.01); *H04B 7/0634* (2013.01)

(58) Field of Classification Search
CPC .. H04B 7/0617; H04B 7/0456; H04B 7/0413; H04B 7/0691; H04B 7/0634; H04W 52/42; H04W 16/28
See application file for complete search history.

(56) References Cited

U.S. PATENT DOCUMENTS

| | | | |
|---|---|---|---|
| 2007/0160011 A1* | 7/2007 | Kim et al. | ...... 370/332 |
| 2008/0181285 A1 | 7/2008 | Hwang et al. | |
| 2008/0318520 A1* | 12/2008 | Kwun et al. | ...... 455/7 |
| 2009/0046009 A1* | 2/2009 | Fujii | ...... 342/373 |

(Continued)

FOREIGN PATENT DOCUMENTS

| | | |
|---|---|---|
| CN | 1281004 C | 10/2006 |
| CN | 101218758 A | 7/2008 |

(Continued)

OTHER PUBLICATIONS

Office Action received for Korean Patent Application No. 10-2012-7016916, mailed on Sep. 27, 2013, 7 pages of Office Action including 3 pages of English translation.

(Continued)

*Primary Examiner* — Jung Park
(74) *Attorney, Agent, or Firm* — Thorpe North & Western LLP

(57) ABSTRACT

A base station transmits to a number of relay stations in a wireless network using a beamforming matrix. The beamforming matrix is generated by first obtaining a column vector from a beamforming matrix associated with each of the relay stations. An intermediate matrix is then generated using these column vectors. A zero-forcing procedure is then utilized to process the intermediate network to generate the final beamforming matrix.

15 Claims, 3 Drawing Sheets

(56) References Cited

U.S. PATENT DOCUMENTS

| | | | |
|---|---|---|---|
| 2009/0147728 A1 | 6/2009 | Atia et al. | |
| 2010/0074356 A1* | 3/2010 | Ashikhmin | 375/267 |
| 2010/0110968 A1* | 5/2010 | Lee et al. | 370/315 |
| 2014/0153662 A1* | 6/2014 | Lin et al. | 375/267 |

FOREIGN PATENT DOCUMENTS

| | | |
|---|---|---|
| CN | 101359950 A | 4/2009 |
| JP | 2006-148867 A | 6/2006 |
| JP | 2009-141949 A | 6/2009 |
| JP | 2012-528061 A | 11/2012 |
| WO | 02/082689 A2 | 10/2002 |
| WO | 2010/138027 A1 | 12/2010 |
| WO | 2011/028943 A1 | 3/2011 |
| WO | 2011078726 A1 | 6/2011 |

OTHER PUBLICATIONS

Office action received for Japanese Patent Application No. 2012-543040, mailed on Sep. 24, 2013, 4 pages including 2 pages of English translation.

Kim, J et al., "Linear Beamforming for Multiuser MIMO Downlink Systems with Channel Orthogonalization", Global Telecommunications Conference, 2009. Globecom 2009. IEEE, IEEE, Piscataway, NJ, USA, XP031646365 ISBN: 978-1-4244-4148-8,(Nov. 30, 2009),1-6.

Ribeiro, C B., et al., "Performance of linear multi-user MIMO precoding in LTE system", Wireless Pervasive Computing, 2008. ISWPC 2008. 3rd International Symposium on, IEEE, Piscataway,NJ, USA,, XP031281271 ISBN: 978-1-4244-1652-3,(May 7, 2008), 410-414.

Office Action received for Korean Patent Application No. 10-2012-7016916, mailed on Apr. 23, 2014, 6 pages of Office Action including 3 pages of English Translation.

Office Action received for Chinese Patent Application No. 200980163 1588, mailed on Mar. 31, 2014, 23 pages of Office Action including 14 ages of English Translation.

Office Action received for Japanese Patent Application No. 2012-543040, mailed on May 27, 2014, 2 pages of Office Action including 1 page of English Translation.

International Preliminary Report on Patentability and Written Opinion Received for PCT Patent Application No. PCT/RU2009/000728, mailed on Jul. 5, 2012, 8 pages.

International Search Report and Written Opinion received for PCT Patent Application No. PCT/RU2009/000728, mailed on Sep. 29, 2010, 15 pages.

Spencer, Q. H. et al., "Zero-Forcing Methods for Downlink Spatial Multiplexing in Multiuser MIMO Channels,", IEEE Transactions Signal Processing, vol. 52, No. 2, Feb. 2004, pp. 461-471.

Spencer, Q. H. et al., "An Introduction to the Multi-User MIMO Downlink", IEEE Communications Magazine, vol. 42, No. 10, Oct. 2004, pp. 60-67. (Only Abstract Submitted).

Schubert M. et al., "Solution of the Multiuser Downlink Beamforming Problem with Individual SINR Constraints", IEEE Transactions Vehicular Technology, vol. 53, Issue: 1, Jan. 2004, pp. 18-28. (Only Abstract Submitted).

Shi, S. et al., "Downlink MMSE Transceiver Optimization for Multiuser MIMO Systems: Duality and Sum-MSE Minimization", IEEE Transactions on Signal Processing, vol. 55, No. 11, Nov. 2007, pp. 5436-5446. (Only Abstract Submitted).

Bengtsson M. et al., "Optimal and Suboptimal Transmit Beamforming", Chapter 18 in Handbook of Antennas in Wireless Communications, L. C. Godara, edition, CRC Press, 2001, 33 pages.

Matskani, E. et al., "Convex Approximation Techniques for Joint Multiuser Downlink Beamforming and Admission Control", IEEE Trans. Wireless Commun., vol. 7, No. 7, Jul. 2008, pp. 2682-2693.

G. Li, et al., "Proposed Text of DL MIMO Transmission Scheme Section for the IEEE 802.16m", Intel's submission to IEEE 802.16m, Jan. 2009.

* cited by examiner

METHOD AND APPARATUS FOR DOWNLINK MULTIUSER MIMO TRANSMISSION IN A WIRELESS NETWORK

TECHNICAL FIELD

The invention relates generally to wireless communications and, more particularly, to techniques for performing downlink multiuser multiple input-multiple output (MIMO) transmission in a wireless network.

BACKGROUND OF THE INVENTION

Many modern broadband wireless access systems (e.g., WiMAX) use space-time signal processing that exploits multiple antennas at the transmitting (TX) and receiving (RX) ends of the communication link. Future systems (e.g., WiMAX II) are expected to further improve performance by applying a number of advanced techniques like multi-user (MU) multiple-input/multiple-output (MIMO) transmission. There is a need for beamforming techniques that may be used in the downlink of a multi-user MIMO network.

DETAILED DESCRIPTION

Figure 1:
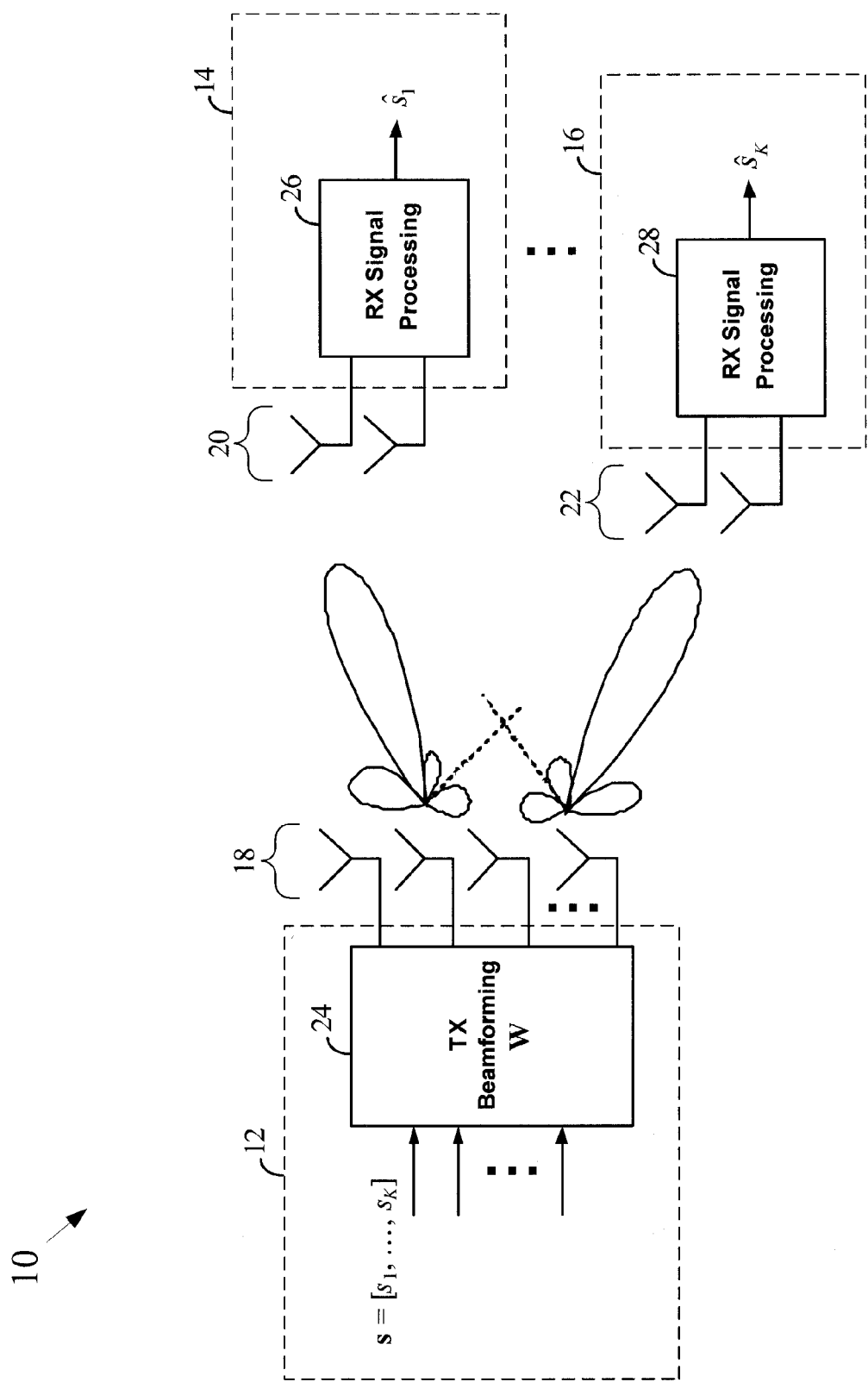
FIG. 1 is a block diagram illustrating a wireless network arrangement that may incorporate features of the present invention.

In the following detailed description, reference is made to the accompanying drawings that show, by way of illustration, specific embodiments in which the invention may be practiced. These embodiments are described in sufficient detail to enable those skilled in the art to practice the invention. In the drawings, like numerals refer to the same or similar functionality throughout the several views.

The present invention relates to techniques and structures for performing beamforming in the downlink from a base station to a number of relay stations (or other wireless device) in a wireless network that uses multi-user, multiple-input/multiple-output (MIMO). The techniques and structures of the present invention are most beneficial when the relay stations each have multiple antennas, but only a single data stream is being transmitted to each relay station. This scenario is assumed to be very common in, for example, practical WiMAX implementations. One of the situations that is among the most advantageous for the proposed techniques is the stationary scenario where a base station equipped with four antennas (which is typical for a base station) is sending two spatial streams to two relay stations (one spatial stream per relay), where each relay is equipped with two antennas (which is typical for a relay station). In such system, it is possible to support four spatial streams, with two spatial streams being transmitted to each relay station. However, this mode will not typically be effective since the channel from the base station to the relay station will usually have a strong Line-of-Sight (LOS) path and, therefore, the system will have one strong first spatial channel and one weak second spatial channel. So the system configuration for the developed techniques (i.e., where MU-MIMO systems use fewer spatial streams than they are capable of supporting) is practical and is an important usage case especially for future broadband wireless access systems with relays (e.g., WiMAX II). The techniques and structures of the present invention are capable of achieving substantial increases in system throughput by employing multiplexing for transmission of data from the base station to the relays and using simultaneous transmission to send data from the relays to the multiple users.

FIG. 1 is a block diagram illustrating a wireless network arrangement 10 that may incorporate features of the present invention. As illustrated, the network arrangement 10 may include: a base station 12 and two or more relay stations 14, 16. During network operation, two-way wireless communication between the base station 12 and the relay stations 14, 16 will occur. The communication from the base station 12 to the relay stations 14, 16 is known as downlink communication and the communication from the relay stations 14, 16 to the base station 12 is known as uplink communication. As shown in the embodiment of FIG. 1, the base station 12 and the relay stations 14, 16 each have multiple antennas. That is, the base station 12 has at least 4 antennas 18 and the relay stations 14, 16 have two antennas 20, 22 each. Because the relay stations 14, 16 have two antennas each, the base station 12 will be able to transmit two spatial streams to each of the relays 14, 16. However, as described above, the channel from the base station to a relay station will usually have a strong LOS path, which typically results in one strong first spatial channel and one weak second spatial channel. Therefore, in at least one implementation of the invention, the number of spatial streams that is used to transmit to each of the relay stations 14, 16 will be less than the total number of possible spatial streams.

Referring to FIG. 1, the base station 12 includes a transmit beamformer 24 to provide beamforming for signals to be transmitted to the relay stations 14, 16. A plurality of symbols $s=[s_1, \ldots, s_K]$ are delivered to an input of the beamformer 24 and the beamformer 24 processes these symbols using a beamforming matrix W before the symbols are transmitted from the antennas 18. The beamformer processing will cause signals to be transmitted in appropriately directed spatial streams to the respective relay stations 14, 16. Once received by the relay stations 14, 16, the signals may be processed using receiver signal processing 26, 28 to estimate corresponding data symbol $\hat{s}_1$-$\hat{s}_K$ within each of the relay stations 14, 16. The base station 12 and the relay stations 14, 16 may each include one or more digital processing devices for performing communications related functions. These digital processing devices may include, for example, a general purpose microprocessor, a digital signal processor (DSP), a reduced instruction set computer (RISC), a complex instruction set computer (CISC), a field programmable gate array (FPGA), an application specific integrated circuit (ASIC), a microcontroller, and/or others, including combinations of the above.

In one aspect of the present invention, techniques are provided for generating a beamforming matrix that may be used within a beamformer, such as the beamformer 24 of FIG. 1, to transmit data signals to multiple relay stations in a wireless network. In various implementations, the techniques may be used to achieve a substantial increase in throughput by employing multiplexing for transmission of data from a base station to multiple relays and by using simultaneous transmission to send data from the relays to multiple users. In the discussion that follows, a beamforming matrix generation technique will be discussed for the general case of a single base station having M antennas (M>1) transmitting to K different relay stations/user stations that each have multiple receive antennas. The number of receive antennas within each relay station will be designated $N_k$ and the total number of receive antennas within the K relay stations will be $N=N_1+N_2+\ldots+N_K$. It is assumed for this description that the base station will send one spatial data stream to each relay station resulting in K parallel spatial data streams being transmitted (represented herein by the vector $s=[s_1, \ldots, s_K]$). The signal received by the kth relay station may be expressed as:

$$y_k = H_k \cdot W \cdot s + n_k$$

where $H_k$ is the $N_k \times M$ channel matrix between the base station and the kth relay station; $n_k$ is the additive white Gaussian noise vector at the kth relay station receive antennas with power $\sigma^2$ and correlation $E[n_k \cdot n_k^H] = \sigma^2 I$; and W is the transmit beamforming matrix. The transmit beamforming matrix W will consist of individual precoder vectors corresponding to the K relay stations (i.e., $W=[w_1, \ldots, w_K]$). The overall channel matrix between the base station and the K relay stations can be expressed as $H^H = [H_1^H, H_2^H, \ldots, H_K^H]$, where $H^H$ is the conjugate transpose of the matrix H.

To generate the transmit beamforming matrix W, a singular value decomposition (SVD) is first performed for the channel matrix associated with each of the K relay stations. This may be expressed as follows:

$$\begin{cases} svd(H_1) = U_1 \Lambda_1 V_1^H \\ \vdots \\ svd(H_K) = U_K \Lambda_K V_K^H \end{cases}$$

The SVD calculation may be done at the base station or at the individual relay stations. If done at the base station, each of the relay stations will have to feed back the channel matrix $H_k$ to the base station. If done at the relay stations, each of the relay stations will only have to feed back the largest column vector $v_k^{(1)}$ of the beamforming matrix $V_k$ to the base station. In one possible scenario, the proposed technique will be used to perform spatial multiplexing for relay stations that are stationary and have stationary propagation channel characteristics. In such a case, it can be assumed that the feedback speed will not limit practical applications of the proposed technique. Therefore, the feedback information may be sent at a low speed in these circumstances.

After the SVD calculations have been completed and the base station has the column vector $v_k^{(1)}$ (corresponding to the maximum singular value) of each beamforming matrix $V_k$, the intermediate beamforming matrix $W_{SVD}$ may be constructed as follows:

$$W_{SVD} = [v_1^{(1)}, v_2^{(2)}, \ldots, v_K^{(1)}].$$

The vectors $v_k^{(1)}$ represent the well-known SVD transmit beamforming vectors that provide independent maximization of the received signal power for each relay station. However, if the matrix $W_{SVD}$ is directly applied as a transmit beamforming matrix, then severe interference may occur between transmissions to the different relay stations. To reduce the interference caused by the transmit beamforming, a zero-forcing procedure is applied to the beamforming matrix $W_{SVD}$ as follows:

$$W_0 = W_{SVD}(W_{SVD}^H W_{SVD})^{-1}; \text{ and}$$

$$W_{ZF-SVD} = W_0/\text{trace}(W_0^H W_0).$$

where trace (A) is the trace of matrix A, which is the sum of the elements on the main diagonal of the matrix (i.e., the diagonal from the upper left to the lower right). The matrix $W_{ZF-SVD}$ may then be used as the transmit beamforming matrix of the base station.

In essence, the proposed solution first finds the transmit directions for every relay station independently to maximize the received signal power without taking into account the mutual interference between devices. Then, the zero-forcing operation is applied to the transmit vectors to change them from vectors that result in maximum power transmission to vectors that reduce mutual interference. The zero-forcing operation, however, guarantees a zero interference level along the vector of maximum power transmission for each relay station. As a result, each relay station will typically have a non-zero interference level at its receive antennas, but it will be capable of suppressing this interference using an appropriate receiver signal processing algorithm (e.g., the minimum mean square error (MMSE) algorithm). The present technique therefore reaches a compromise between interference level and power transfer level in the downlink of a MIMO network which, effectively, is a compromise between interference level and thermal noise level.

Figure 2:
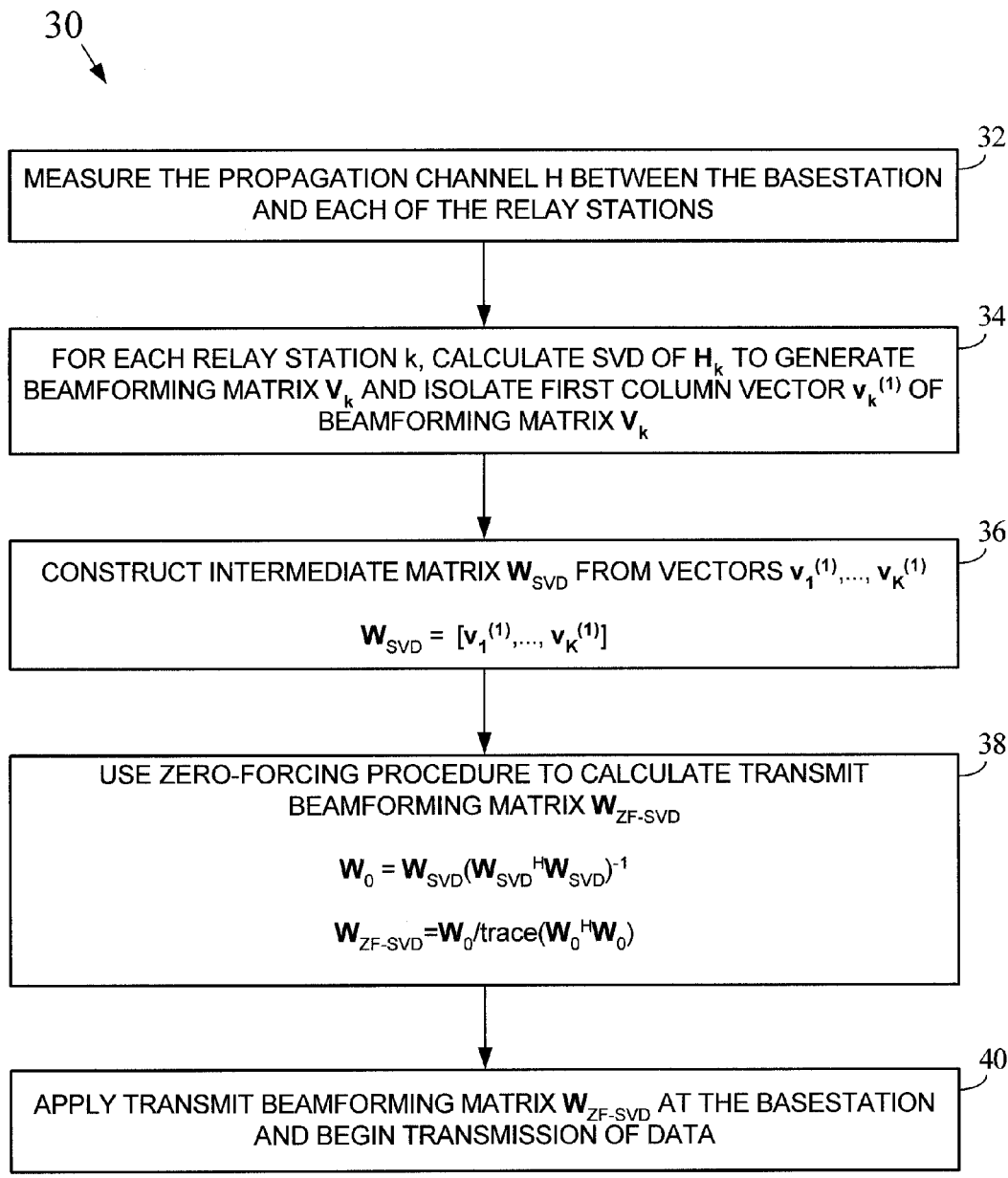
FIG. 2 is a flowchart illustrating a method for generating and using a beamforming matrix W for use in transmitting data signals to multiple relay stations in accordance with an embodiment of the present invention.

FIG. 2 is a flowchart illustrating a method 30 for generating and using a beamforming matrix W for use in transmitting data signals to multiple relay stations in accordance with an embodiment of the present invention. The method 30 may be implemented within, for example, the wireless network arrangement of FIG. 1 to transmit data signals from the base station 12 to the relay stations 14, 16. Other applications also exist. First, a propagation channel $H_k$ between a wireless base station and each of a plurality of wireless relay stations is measured (block 32). Typically, the channel matrix $H_k$ for each relay station will be generated within the relay station. For each relay station k, a singular value decomposition (SVD) of $H_k$ is calculated to generate a corresponding beamforming matrix $V_k$ (block 34). A first column vector $v_k^{(1)}$ is then extracted from each of the beamforming matrices $V_k$. In one approach, the SVD of each $H_k$ is calculated within the corresponding relay station. In this scenario, each relay station will have to extract $v_k^{(1)}$ from the beamforming matrix $V_k$ and transmit it to the base station for further processing. In another approach, each of the relay stations may transmit its entire channel matrix $H_k$ to the base station and the base station performs the SVD. The base station then extracts the column vector $v_k^{(1)}$.

An intermediate matrix $W_{SVD}$ is next constructed from the extracted vectors $v_1^{(1)}, \ldots, v_K^{(1)}$ (block 36). The matrix $W_{SVD}$ may have the form:

$$W_{SVD} = [v_1^{(1)}, \ldots, v_K^{(1)}]$$

After the intermediate matrix $W_{SVD}$ has been generated, zero-forcing is used to calculate the beamforming matrix $W_0$. This calculation may be expressed as follows:

$$W_0 = W_{SVD}(W_{SVD}^H W_{SVD})^{-1}$$

where W is the beamforming matrix that will be applied by the transmitted within the base station and $X^H$ is the conjugate transpose of matrix X. After the beamforming matrix W has been generated, it may be applied at the base station to transmit data to the plurality of wireless relay stations (block 40). When each of the relay stations receives its intended signal, it will proceed to process the signal to estimate the corresponding data. Any of a number of different multi-antenna signal processing algorithms may be used in each relay station. In at least one embodiment, for example, minimum mean square error (MMSE) processing is utilized in the receivers of the relay stations.

Figure 3:
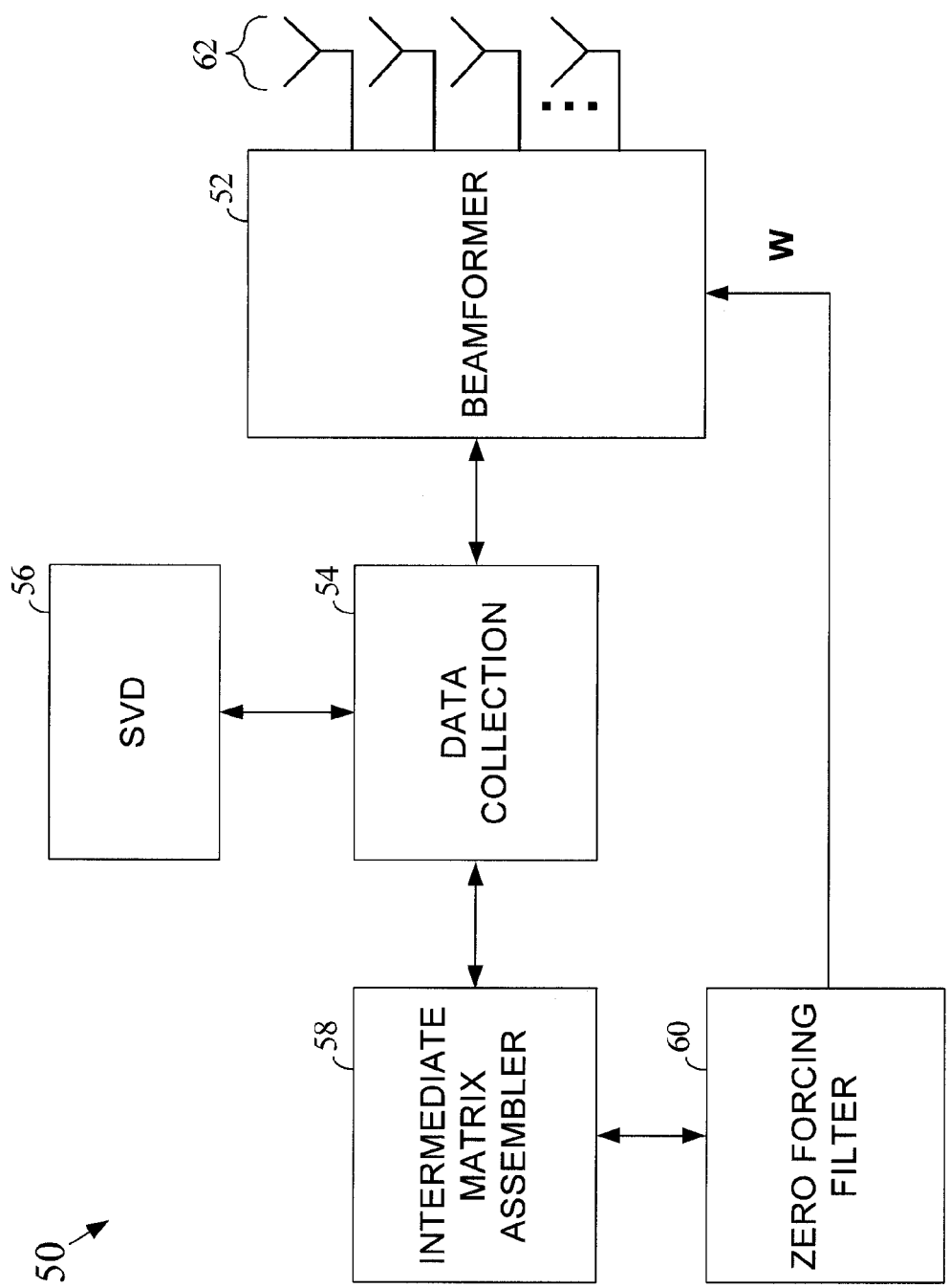
FIG. 3 is a block diagram illustrating an example base station in accordance with an embodiment of the present invention.

FIG. 3 is a block diagram illustrating an example base station 50 in accordance with an embodiment of the present invention. As shown, the base station 50 includes: a beamformer 52, a data collection unit 54, a singular value decomposition (SVD) unit 56, an intermediate matrix assembler 58, and a zero-forcing filer 60. The configuration of FIG. 3 may be used, for example, to generate a new beamforming matrix for the beamformer 52. The beamformer 52 is coupled to a number of antennas 62 to facilitate the transmission of signals into a wireless channel. Any type of antennas may be used, including, for example, a dipole, a patch, a helical antenna, and/or others. The data collector 54 is operative for collecting data from remote multi-antenna wireless devices to which the base station 50 is communicating. The intermediate matrix assembler 58 is operative for assembling an intermediate matrix $W_{SVD}$ using individual beamformer column vectors $v_k^{(1)}$ collected for the remote wireless devices. The zero-forcing filter 60 uses zero-forcing to act upon the intermediate matrix $W_{SVD}$ to generate a new beamforming matrix to be used by the beamformer 52.

As described previously, the SVD operations may be performed within the remote wireless devices (e.g., relay stations, etc.) or they may be performed within the base station 50. If the base station 50 is to perform the SVD operations, then the data collection unit 54 will collect channel estimates $H_k$ (or information from which the channel estimates can be derived) from the remote wireless devices. The channel estimates will typically be generated within the remote wireless devices using training sequences received from the base station 50. Once one or more of the channel estimates have been received by the data collection unit 54, the data collection unit 54 will have each estimate processed by the SVD unit 56 to generate a beamforming matrix for the corresponding remote wireless device. The data collection unit 54 will then extract the largest column vector $v_k^{(1)}$ of the beamforming matrix associated with each of the remote wireless devices. The intermediate matrix assembler 58 will then assemble the column vectors $v_k^{(1)}$ into the intermediate matrix $W_{SVD}$. The zero-forcing filter 60 will then operate upon the intermediate matrix $W_{SVD}$ to calculate the transmit beamforming matrix W, in the manner described previously, and feed the matrix W to the beamformer 52. Beamformed data may then be transmitted to the remote wireless devices from the base station 50.

If the remote wireless devices are to perform the SVD operations, then each of these devices will need to have and SVD unit of their own. The devices will each independently generate a channel estimate describing the wireless channel between the base station 50 and the device. Each wireless device will then calculate an SVD of the channel estimate to generate a beamforming matrix. The wireless devices will then each extract the largest column vector $v_k^{(1)}$ from the corresponding beamforming matrix and transmit the column vector to the base station 50. The data collection unit 54 within the base station 50 will collect these column vectors. The intermediate matrix assembler 58 will then assemble the intermediate matrix using the collected column vectors $v_k^{(1)}$. As before, the zero-forcing filter 60 will then operate upon the intermediate matrix $W_{SVD}$ to calculate the transmit beamforming matrix W, in the manner described previously, and feed the matrix W to the beamformer 52. Beamformed data may then be transmitted to the remote wireless devices from the base station 50.

Note that the above description of embodiments of the invention are made in the context of a frequency non-selective propagation channel. For a frequency selective propagation channel, such as a multicarrier channel, the proposed techniques should be appropriately extended. For example, for OFDM or OFDMA based systems, the described technique of generating the transmit antenna beamforming matrix $W_{ZF-SVD}$ would have to be performed for each subcarrier having data to be transmitted.

The techniques and structures of the present invention may be implemented in any of a variety of different forms. For example, features of the invention may be embodied within laptop, palmtop, desktop, and tablet computers having wireless capability; personal digital assistants (PDAs) having wireless capability; cellular telephones and other handheld wireless communicators; pagers; satellite communicators; cameras having wireless capability; audio/video devices having wireless capability; network interface cards (NICs) and other network interface structures; base stations; wireless access points; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data. Hardware, software, firmware, and hybrid implementations may be used.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A computer implemented method comprising:
at a multi-antenna base station that is communicating with K multi-antenna relay stations where K is an integer greater than 1, obtaining a column vector $v_k^{(1)}$ of a beamforming matrix associated with each of said K multi-antenna relay stations;
assembling an intermediate matrix $W_{SVD}$ using said column vectors;
using zero-forcing on said intermediate matrix $W_{SVD}$ to calculate a transmit beamforming matrix W for use by said multi-antenna base station to transmit data to said K relay stations, wherein the transmit beaming matrix W includes using zero-forcing to calculate:

$$W_0 = W_{SVD}(W_{SVD}^H W_{SVD})^{-1}, \text{ and}$$

$$W_{ZF-SVD} = W_0/\text{trace}(W_0^H W_0),$$

wherein H is a conjugate transpose of the intermediate matrix $W_{SVD}$ and trace is the trace of $(W_0^H W_0)$; and
transmitting data from said multi-antenna base station to said K relay stations using said transmit beamforming matrix W, wherein the relay stations are stationary and have stationary propagation channels.

2. The method of claim 1 wherein:
assembling an intermediate matrix $W_{SVD}$ using said column vectors includes assembling a matrix $W_{SVD} = [v_1^{(1)}, \ldots, v_K^{(1)}]$.

3. The method of claim 1 wherein:
using zero-forcing on said intermediate matrix $W_{SVD}$ to calculate said transmit beamforming matrix W includes using zero-forcing to calculate:

$$W = W_{SVD}(W_{SVD}^H W_{SVD})^{-1}.$$

4. The method of claim 1 wherein:
obtaining a column vector $v_k^{(1)}$ of a beamforming matrix associated with each relay station within said K multi-antenna relay stations includes receiving a column vector $v_1^{(1)}$ from a first relay station, wherein said first relay station generated a channel matrix for a channel between said base station and said first relay station, performed a singular value decomposition (SVD) on the channel matrix to generate a beamforming matrix, and extracted said column vector $v_1^{(1)}$ from said beamforming matrix before transmitting said column vector $v_1^{(1)}$ to said base station.

5. The method of claim 1 wherein:
obtaining a column vector $v_k^{(1)}$ of a beamforming matrix associated with each relay station within said K multi-antenna relay stations includes receiving at said base station, from a first relay station, a channel matrix for a channel between said base station and said first relay station, performing a singular value decomposition (SVD) on said channel matrix at said base station to generate a beamforming matrix, and extracting a column vector $v_1^{(1)}$ from said beamforming matrix.

6. An apparatus comprising:
a beamformer to precode data to be transmitted from multiple antennas to K remote relay stations using a beamforming matrix W, where K is an integer greater than 1;
a data collection unit to collect a largest column vector $v_k^{(1)}$ of a beamforming matrix associated with each of said K remote relay stations;
an intermediate matrix assembler to assemble an intermediate matrix $W_{SVD}$ using said largest column vectors $v_k^{(1)}$; and
a zero-forcing filter to perform zero-forcing on said intermediate matrix $W_{SVD}$ to generate a transmit beamforming matrix W for use by the beamformer, wherein the zero-forcing filter performs zero-forcing on the intermediate matrix $W_{SVD}$ using:

$$W_0 = W_{SVD}(W_{SVD}(W_{SVD}^H W_{SVD})^{-1}, \text{ and}$$

$$W_{ZF\text{-}SVD} = W_0/\text{trace}(W_0^H W_0),$$

wherein H is a conjugate transpose of the intermediate matrix $W_{SVD}$ and trace is the trace of $(W_0^H W_0)$.

7. The apparatus of claim 6, wherein said intermediate matrix assembler assembles said intermediate matrix as:

$$W_{SVD} = [V_1^{(1)}, \ldots, V_K^{(1)}].$$

8. The apparatus of claim 6, wherein said zero-forcing filter performs zero-forcing on said intermediate matrix $W_{SVD}$ as follows:

$$W = W_{SVD}(W_{SVD}^H W_{SVD})^{-1}.$$

9. The apparatus of claim 6, wherein:
said data collection unit is configured to receive said largest column vectors $v_k^{(1)}$ directly from said K remote relay stations.

10. The apparatus of claim 6, wherein:
said data collection unit is configured to receive a channel estimate from each of said K remote relay stations, each channel estimate being for a channel between said apparatus and a corresponding remote relay station, wherein said data collection unit is configured to use a singular value decomposition (SVD) unit to perform a SVD on each received channel estimate to generate a beamforming matrix and extract a largest column vector $v_k^{(1)}$ of said beamforming matrix.

11. A non-transitory computer readable storage medium having computer executable instructions stored thereon that, when executed by a computing platform, operate to:
obtain a column vector $v_k^{(1)}$ of a beamforming matrix associated with each of K multi-antenna relay stations, where K is an integer greater than 1;
assemble an intermediate matrix $W_{SVD}$ using said column vectors;
use zero-forcing on said intermediate matrix $W_{SVD}$ to calculate a transmit beamforming matrix W for use by said multi-antenna base station to transmit data to said K multi-antenna wireless, wherein the transmit beaming matrix W includes using zero-forcing to calculate:

$$W_0 = W_{SVD}(W_{SVD}^H W_{SVD})^{-1}, \text{ and}$$

$$W_{ZF\text{-}SVD} = W_0/\text{trace}(W_0^H W_0),$$

wherein H is a conjugate transpose of the intermediate matrix $W_{SVD}$ and trace is the trace of $(W_0^H W_0)$; and
transmit data to said K multi-antenna relay stations using said transmit beamforming matrix W, wherein the relay stations are stationary and have propagation channels.

12. The non-transitory storage medium of claim 11, wherein:
said operation to assemble an intermediate matrix $W_{svp}$ using said column vectors includes an operation to assemble a matrix $W_{SVD} = [V_1^{(1)}, \ldots, V_K^{(1)}]$.

13. The non-transitory storage medium of claim 11, wherein:
said operation to use zero-forcing on said intermediate matrix $W_{SVD}$ to calculate said transmit beamforming matrix W includes an operation to use zero-forcing to calculate:

$$W = W_{SVD}((W_{SVD}^H W_{SVD})^{-1}.$$

14. The non-transitory storage medium of claim 11, wherein:
said operation to obtain a column vector $v_k^{(1)}$ of a beamforming matrix associated with each of K multi-antenna relay stations includes an operation to receive a column vector $v_1^{(1)}$ from a first relay station of said K multi-antenna relay stations, wherein said first relay station had generated a channel matrix for a wireless channel associated with said first relay station, performed a singular value decomposition (SVD) on said channel matrix to generate a beamforming matrix, and extracted said column vector $v_1^{(1)}$ from said beamforming matrix before transmitting said column vector $v_1^{(1)}$.

15. The non-transitory storage medium of claim 11, wherein:
said operation to obtain a column vector $v_k^{(1)}$ of a beamforming matrix associated with each of K multi-antenna relay stations includes an operation to receive, from a first relay station of said K multi-antenna relay stations, a channel matrix for a channel associated with said first relay station, an operation to perform a singular value decomposition (SVD) on said channel matrix to generate a beamforming matrix, and an operation to extract a column vector $v_1^{(1)}$ from said beamforming matrix.

* * * * *